(12) United States Patent  
Nelson et al.

(10) Patent No.: US 12,510,525 B2  
(45) Date of Patent: Dec. 30, 2025

(54) METHOD FOR OPERATING A COOKING APPLIANCE, AND COOKING APPLIANCE

(71) Applicant: Miele & Cie. KG, Guetersloh (DE)

(72) Inventors: Helge Nelson, Warendorf (DE); Timo Bangrazi, Muenster (DE); Volker Backherms, Osnabrueck (DE)

(73) Assignee: MIELE & CIE. KG, Guetersloh (DE)

( * ) Notice: Subject to any disclaimer, the term of this patent is extended or adjusted under 35 U.S.C. 154(b) by 885 days.

(21) Appl. No.: 17/625,102

(22) PCT Filed: Jun. 23, 2020

(86) PCT No.: PCT/EP2020/067485  
§ 371 (c)(1),  
(2) Date: Jan. 6, 2022

(87) PCT Pub. No.: WO2021/008825  
PCT Pub. Date: Jan. 21, 2021

(65) Prior Publication Data  
US 2022/0283135 A1  Sep. 8, 2022

(30) Foreign Application Priority Data  
Jul. 15, 2019  (DE) ............ 10 2019 119 075.4

(51) Int. Cl.  
*G01N 33/02* (2006.01)  
*A47J 36/32* (2006.01)  
(Continued)

(52) U.S. Cl.  
CPC .............. *G01N 33/02* (2013.01); *A47J 36/32* (2013.01); *G01N 22/00* (2013.01); *G05B 19/042* (2013.01);  
(Continued)

(58) Field of Classification Search  
CPC ........ G01N 33/02; G01N 22/00; G06V 20/68; G06V 10/70; A47J 36/32; G05B 19/042; G05B 2219/2643; H05B 2206/044  
See application file for complete search history.

(56) References Cited

U.S. PATENT DOCUMENTS

2011/0002677 A1* 1/2011 Cochran ............... H05B 3/148  
392/407  
2017/0290095 A1* 10/2017 Pereira ................... G06N 3/084  
2019/0059133 A1   2/2019 Leindecker et al.

FOREIGN PATENT DOCUMENTS

DE  102018105232 A1  9/2019  
EP  2983453 A1  2/2016

OTHER PUBLICATIONS

O'farrell, M., et al. "Combining principal component analysis with an artificial neural network to perform online quality assessment of food as it cooks in a large-scale industrial oven." Sensors and Actuators B: Chemical 107.1 (2005): 104-112. (Year: 2005).*

(Continued)

*Primary Examiner* — Robert J Eom  
(74) *Attorney, Agent, or Firm* — LEYDIG, VOIT & MAYER, LTD.

(57) ABSTRACT

A method for operating a cooking appliance having at least one cooking chamber for preparing food includes detecting high-frequency data during a cooking process using at least one high-frequency measuring system. The method further includes deriving at least one cooking parameter characterizing the food from the high-frequency data using at least one processing system. The high-frequency data is processed using at least one self-learning model of machine learning stored in the processing device. The processing device independently derives the cooking parameter from the high-frequency data via the model.

13 Claims, 1 Drawing Sheet

(51) Int. Cl.
  *G01N 22/00* (2006.01)
  *G05B 19/042* (2006.01)
  *G06V 10/70* (2022.01)
  *G06V 20/68* (2022.01)
(52) U.S. Cl.
  CPC .............. *G06V 10/70* (2022.01); *G06V 20/68* (2022.01); *G05B 2219/2643* (2013.01)

(56) References Cited

OTHER PUBLICATIONS

Khan, Tareq. "Smart Microwave Oven with Image Classification and Temperature Recommendation Algorithm." International Journal of Electrical & Computer Engineering (2088-8708) 8.6 (2018). (Year: 2018).*

Gibson, Andrew AP, et al. "An overview of microwave techniques for the efficient measurement of food materials." Food Manufacturing Efficiency 2.1 (2008): 35. (Year: 2008).*

* cited by examiner

METHOD FOR OPERATING A COOKING APPLIANCE, AND COOKING APPLIANCE

CROSS-REFERENCE TO PRIOR APPLICATIONS

This application is a U.S. National Phase application under 35 U.S.C. § 371 of International Application No. PCT/EP2020/067485, filed on Jun. 23, 2020, and claims benefit to German Patent Application No. DE 10 2019 119 075.4, filed on Jul. 15, 2019. The International Application was published in German on Jan. 21, 2021 as WO 2021/008825 A1 under PCT Article 21(2).

FIELD

The present invention relates to a method for operating a cooking appliance having at least one cooking chamber for preparing food, and to a cooking appliance. During the cooking process, high-frequency data is detected by means of at least one high-frequency measuring system. At least one cooking parameter characterizing the food is derived from the high-frequency data by means of at least one processing device.

BACKGROUND

There are various approaches for automating the cooking process in preparing foodstuffs in cooking appliances and, for example, ovens. In this regard, attempts are often made to allow the cooking appliance to recognize the point in time at which the food is finished so that the appliance can end the cooking process at the right time. Over-cooking or burning, for example, can thus be avoided without any supervision by the user.

For baked goods, for example, there exist moisture sensors which detect the finished point in time by means of a maximum in the cooking chamber moisture. The baking process can then be ended automatically. For meat goods, meat thermometers are often used to measure the core temperature. When a certain core temperature is reached, the cooking process is then ended in an automated manner. However, it is disadvantageous that these methods are generally only suitable for very specific cooking processes, for example only for baking or only for roasting meat.

For appliances for the dielectric heating of foodstuffs, for example microwave appliances, it has been known that the energy absorbed by the foodstuff is ascertained by means of high-frequency technology. So that the finished point in time of the food can thereby be recognized and the cooking process ended in an automated manner, the amount of energy required for the foodstuff or recipe must be estimated. Therefore, although this method is very reliable and convenient, it requires either recipes with required amounts of energy or corresponding experience of the user.

Overall, the options known from the prior art for automated implementation of cooking processes still have potential for improvement in order to enable them to be applied even with different foods and to recipes not stored in the appliance.

SUMMARY

In an embodiment, the present invention provides a method for operating a cooking appliance having at least one cooking chamber for preparing food, comprising: detecting high-frequency data during a cooking process using at least one high-frequency measuring system, and deriving at least one cooking parameter characterizing the food from the high-frequency data using at least one processing device, wherein the high-frequency data is processed using at least one self-learning model of machine learning stored in the processing device, and the processing device independently derives the at least one cooking parameter from the high-frequency data via the at least one self-learning model.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
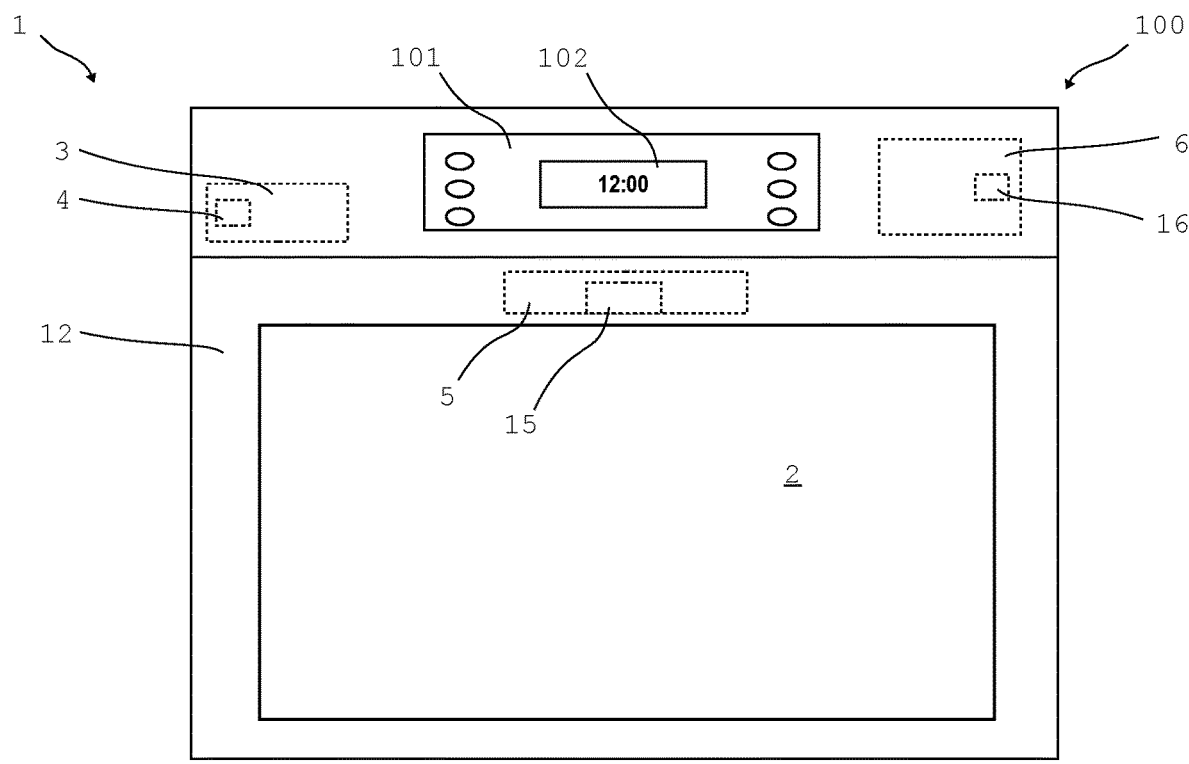
FIG. 1 shows a purely schematic depiction of a cooking appliance according to the invention, in a front view.

In some embodiments, the present invention provides an improvement to automated implementation of cooking processes in a cooking appliance and, in particular, to also enable it for as many recipes and potential combinations of foodstuffs and cooking processes as possible.

The method according to the invention serves to operate a cooking appliance having at least one cooking chamber for preparing food. During the cooking process, high-frequency data, ideally high-frequency spectra over a relatively large frequency range, are detected by means of at least one high-frequency measuring system. At least one cooking parameter, preferably a plurality of cooking parameters, characterizing the food is derived from the high-frequency data by means of at least one processing device. The high-frequency data are thereby processed by means of at least one model of machine-learning, in particular a self-learning model, stored in the processing device. Via the model, the processing device independently derives the cooking parameter from the high-frequency data.

The method according to the invention offers many advantages. Using the model of machine learning to calculate the cooking parameter from the high-frequency data offers a significant advantage. The cooking parameter can thereby be reliably predicted or determined even for a widest variety of cooking processes and for high-frequency data that are previously unknown from the model and not stored in the processing device. Therefore, even a widest variety of meals can be prepared reliably and conveniently in an automated manner with the invention. Via its model, the invention can, for example, reliably ascertain the finished point in time even if recipes are implemented for which the appliance, due to the many different possible combinations of foodstuffs, is not specifically set up at the factory or which are not stored as such in the appliance.

In this context, it is also important that the cooking process includes inserting the cooking vessel, including the dough. The system is thereby able to evaluate the difference between an empty cooking chamber and a loaded cooking chamber.

The high-frequency measuring system preferably detects at least one reflection spectrum, and in particular at least two and preferably a plurality of reflection spectra, of the cooking chamber and/or of the food. The high-frequency data are thereby calculated from the reflection spectra by means of the processing device. In particular, a further processing or computation of the reflection spectra is then provided. It is also possible that the high-frequency data are reflection spectra. The reflection spectra are then preferably used directly for calculating the cooking parameter. In particular, the reflection spectra are or comprise scattering parameters or S-parameters, or are variables derived from the scattering parameters. This offers a particularly reliable and reproducible determination of the cooking parameter.

Within the scope of the present invention, the term "reflection spectra" should be understood in particular to mean both spectra in the sense of frequency ranges and in particular pulses in the sense of time domains. In all embodiments, it is preferred that the high-frequency measuring system is suitable and designed to detect reflection spectra (in particular frequency ranges) and/or pulses (in particular time domains) that preferably characterize the cooking chamber and/or the food, and in particular the cooking chamber interior with its load.

In particular, the high-frequency data describe variations in the reflection spectra over time. For this purpose, the reflection spectra are preferably repeatedly detected during the cooking process. In particular, temporal variations in the reflection spectra are ascertained during the cooking process and used to determine the cooking parameter. The high-frequency data preferably reflect variations in the food and/or the cooking chamber during the cooking process. It is possible that the high-frequency data are computed further before they are supplied to the model. However, the high-frequency data can also be supplied to the model directly or in unprocessed form.

It is preferred that the model is or has been created by and/or is trained by supervised machine learning. For this purpose, at least one data set from a representative set of cooking processes is preferably detected as a reference. The data set preferably comprises at least the high-frequency data. For the learning or training, at least one association of high-frequency data with the cooking parameter is contained as a target variable (also referred to as a label) in this data set. Correlations between the high-frequency data and the cooking parameter are then preferably learned such that the model is subsequently able, in particular independently, to infer the cooking parameter or calculate the cooking parameter on the basis of the high-frequency data. An especially reproducible determination of the cooking parameter can thus be performed even given very different recipes or cooking processes.

It is possible and preferred that the model is taken from a group of model types comprising at least analytical models and, for example, equations, statistical models, and, for example, regressors, artificial neural networks, convolutional neural networks (CNN or ConvNet), and model types of machine learning. CNN stands for convolutional neural networks. The model is preferably designed to be adaptive or self-learning. The model may be suitable and designed to independently optimize the calculation of the cooking parameter from the high-frequency data during the cooking processes or during the operation of the cooking appliance. In particular, feedback about the quality or success rate of the performed calculations is provided for this purpose. It is possible and preferred that suitable models of machine learning other than those listed here can also be used. In particular, the model comprises or is in the form of at least one piece of software. The model in particular provides an artificial intelligence and/or an assistant.

The cooking parameter is preferably taken from a group of parameters comprising at least core temperature, browning state, moisture state, freezing state, thawing state, cooking state, degree of cooking completion, shrinkage, rise, release of water, crust formation, or variations in the aforementioned parameters over time. For example, the cooking parameter indicates whether the food is frozen or thawed. The core temperature is given in degrees Celsius or Kelvin, for example. The cooking parameter can be displayed to the user and/or be provided to a control device for controlling a treatment device. It is possible and preferred that further cooking parameters characterizing the food or the cooking process are also derived via the model.

In a particularly advantageous embodiment, appliance data are also processed with the model. The cooking parameter is thereby independently derived via the model from a combination of the high-frequency data with at least the appliance data. The appliance data are in particular retrieved from and/or provided by a control device of the cooking appliance. The appliance data describe in particular at least one variable that is characteristic of the operation of the cooking appliance. The appliance data describe, for example, an open-loop and/or closed-loop controlled variable for a treatment device. It is possible that the appliance data comprise at least one variable detectable by means of a sensor. Such a combination offers a particularly reliable and reproducible determination of the cooking parameter.

The appliance data are in particular taken from a group of data comprising at least at least thermal and/or energetic state data of the cooking chamber, operating mode, connected loads, and the running time of the cooking process. It is possible and preferred that the appliance data comprise at least one further parameter characterizing the appliance or its operating state.

In a likewise particularly advantageous embodiment, load data are also processed with the model. The cooking parameter is preferably independently derived via the model from a combination of the high-frequency data with at least the load data. In particular, the cooking parameter is independently derived via the model from a combination of the high-frequency data with at least the load data and at least the appliance data. The load data comprise in particular at least one variable that is characteristic of a load of the cooking chamber. Such a combination offers a particularly reliable and reproducible determination of the cooking parameter.

The load data are preferably detected by the high-frequency measuring system. The load data are thereby preferably ascertained from the high-frequency data and/or ascertained by high-frequency measurements performed specifically for this purpose by means of the high-frequency measuring system. It is also possible and preferred that the load data are detected by means of at least one sensor device. In particular, the sensor device comprises at least one camera device. The load data are then preferably ascertained from the image data detected by the camera device. In particular, the camera device detects images from the cooking chamber for this purpose. Other sensors may also be additionally or alternatively provided.

The load data are preferably taken from a group of data comprising at least geometric properties of the food and/or of a food container/carrier, position of the food and/or of a food container/carrier, and type of the food and/or of a food container/carrier. The geometric properties comprise, for example, a height and/or size and/or width and/or length and/or contour and/or shape and/or volume of the food and/or of the food container/carrier. In particular, the load data describe the position of the food and/or of the food container/carrier in the cooking chamber. For example, the load data describe the insertion height of a food carrier into the cooking chamber. The type of food is in particular a foodstuff type and, for example, meat, fish, vegetables, or pasta. The type of food container is in particular a food container material and, for example, glass, metal, plastic, or a mineral material such as clay. It is possible and preferred that the load data comprise at least one further parameter characterizing the load.

In all embodiments, it is particularly preferred that at least one treatment device for preparing food is controlled by means of at least one control device depending on the cooking parameter. At least one parameter of at least one treatment program, also referred to as an automatic function and/or automatic program, is thereby particularly preferably adjusted depending on the cooking parameter. Such an embodiment offers a particularly convenient and at the same time reliable preparation of a widest variety of recipes and foodstuffs. For example, the cooking parameter describes the finished point in time, and the control device ends the cooking process upon reaching the finished point in time and, for example, switches off a heat source for this purpose. In particular, the treatment device is controlled by at least one control device depending on at least one treatment program. In particular, the control device adjusts the treatment program depending on the cooking parameter. Alternatively or additionally, it can be provided that the calculated cooking parameter is communicated to the user, for example via a display device or a mobile terminal or the like.

In particular, high-frequency measuring radiation is emitted into the cooking chamber at a plurality of distinguishable frequencies and/or phases by means of the high-frequency measuring system. In particular, the measuring radiation is received again and evaluated by means of the high-frequency measuring system. The reflection spectra are preferably created using at least one comparison of the received measuring radiation with the emitted measuring radiation on the basis of the frequency and/or the phase. The measuring radiation can thereby also be emitted and/or received and/or evaluated as a pulse, and in particular as an ultra-short pulse.

The cooking appliance according to the invention is suitable and designed to be operated according to the method described above. The cooking appliance comprises in particular at least one treatment device and at least one cooking chamber. In particular, the cooking appliance comprises at least one high-frequency measuring system for detecting high-frequency data during the cooking process. A processing device for processing the high-frequency data is provided either directly in the appliance or at an external location, for example a cloud or a server.

The high-frequency measuring system comprises in particular at least one high-frequency generator and/or at least one (in particular flat or planar) antenna associated with the cooking chamber and/or at least one transmitting unit and/or at least one receiving unit and/or at least one evaluation unit. A plurality of transmitters and/or receivers may also be provided. The high-frequency measuring system is then constructed in particular in the manner of an antenna array, or comprises at least one thereof. The high-frequency measuring system is designed in particular to be broadband and can be operated in particular in a range of 100 MHz to 5 GHz, in which a good excitation of conventional foodstuffs and water is possible. In particular, the frequency range is selected such that a modal analysis is possible at the given cooking chamber cavity size. Other, in particular smaller, frequency ranges are possible. The high-frequency measuring system can in particular transmit and/or receive and/or measure in broadband.

The high-frequency measuring system comprises in particular at least one transmitting-receiving-evaluating transceiver unit. The high-frequency measuring system, in particular the transceiver, is preferably suitable and designed to execute at least one of the following measurement methods: frequency sweep, pulse radar, FMCW (frequency-modulated continuous wave), and other suitable methods for detecting high-frequency data, and in particular reflection spectra.

The treatment device comprises in particular at least one high-frequency device having at least one high-frequency generator for introducing high-frequency radiation into the cooking chamber. This high-frequency radiation is suitable for functioning as measuring radiation. The high-frequency radiation can also be used for preparing food. The high-frequency measuring system is in particular suitable and designed to use the high-frequency radiation, transmitted into the cooking chamber for preparing food, to determine the degree of absorption. A reduction in the transmission power can thereby be provided. The transmission power provided for preparing the food can be maintained for the measurement.

It is possible and preferred that, in order for it to determine the degree of absorption, the high-frequency measuring system is suitable and designed to use a broadband measuring radiation having a power that is multiple times lower (for example ten times or one hundred times lower) than the narrowband high-frequency radiation transmitted into the cooking chamber for preparing food. The measuring radiation is thereby in particular not suitable and designed for preparing food. It is possible that the measuring radiation is generated by the high-frequency measuring system and, for this purpose, that the high-frequency measuring system has its own high-frequency generator. The measuring radiation can also be generated by the high-frequency device of the treatment device.

Further advantages and features of the present invention result from the exemplary embodiments, which are explained below with reference to accompanying Figures.

FIG. 1 shows a cooking appliance 1 according to the invention, which here is executed as an oven 100 or combination appliance. The cooking appliance 1 is operated in accordance with the method according to the invention. The cooking appliance 1 has a heatable cooking chamber 2 which can be closed by a cooking chamber door 12. The cooking appliance 1 here is provided as an integrated appliance. It can also be designed as a floor-mounted appliance.

To prepare food, a treatment device 6 is provided which is arranged in the cooking chamber 2 or in the appliance interior. The treatment device 6 comprises, for example, a heating device having a plurality of heat sources for heating the cooking chamber 2. For example, a top heat and/or a bottom heat, a hot-air heat source and/or a grill heat source, or other types of heat sources may be provided as a heat source. A steam generator can also be provided. In addition, the treatment device 6 can be designed for heating or cooking with high-frequency radiation, and for this purpose can comprise, for example, a high-frequency generator.

Here the cooking appliance 1 comprises a control device 16, operatively connected to the treatment device 6, for controlling appliance functions and operating states in an open-loop or closed-loop manner Pre-selectable operating modes, and preferably also various treatment programs (cooking programs) or program operating modes and other automatic functions, can be executed via the control device 16. For this purpose, the control device 16 controls the treatment device 6 accordingly depending on a pre-selected operating mode or treatment program.

An operating device 101 is provided for operating the cooking appliance 1. For example, via this the operating mode, the cooking chamber temperature, and/or an automatic program or a program operating mode or other automatic functions can be selected and set. Further user inputs may also be performed via the operating device 101 and, for example, a menu control may be performed. The operating device 101 also comprises a display device 102 via which user instructions and, for example, prompts can be displayed. The operating device 101 may comprise operating elements and/or a touch-sensitive display device 102 or a touch screen.

If dielectric heating of food in the cooking chamber 2 by high-frequency radiation is provided, the treatment device 6 is equipped with a high-frequency generator. The high-frequency generator is preferably based on semiconductor technology and is, for example, a solid-state high-frequency generator. However, it is also possible that the high-frequency generator is designed as a magnetron or comprises at least one thereof.

The cooking appliance 1 has a high-frequency measuring system 3 (shown here in a highly schematic manner) having a processing device 4. During the cooking process, the high-frequency measuring system 3 detects reflection spectra and, for example, S-parameters. For this purpose, high-frequency measuring radiation is generated, transmitted into the cooking chamber 2, and received again. The reflection spectra are obtained via a suitable comparison of the emitted measuring radiation with the received or reflected measuring radiation. Here, the measurement takes place via a frequency sweep and/or FMCW, for example. The HF measuring process itself can thereby also be used to heat the food and, for example, can be generated by the high-frequency generator. However, it is also possible to use measuring radiation that has a significantly attenuated power and is generated separately by the high-frequency measuring system 3 or the high-frequency generator for the measuring process.

The reflection spectra are then computed or made available directly as high-frequency data to the processing device 4. A model is stored in the processing device 4, which model derives a cooking parameter from the high-frequency data, for example the core temperature and/or the finished point in time of the food. In the process, the model may thereby be created analytically, statistically, or with machine-learning methods. In one embodiment, appliance data and/or load data are also used for calculating the cooking parameter via the model in combination with the high-frequency data.

The load data can, for example, be obtained by a sensor device 5 in the interior of the cooking appliance 1. For this purpose, the sensor device 5 is, for example, equipped with a camera device 15 which detects images of the cooking chamber and its load. The processing device 4 then evaluates the images accordingly in order to obtain the load data. The camera device 15 can, for example, detect two-dimensional or three-dimensional or spatial image information, or temperature-specific image information or thermal images, from the cooking chamber 2. However, the load data can also be ascertained from the reflection spectra. Here, the appliance data are provided by the control device 16.

Here the hardware comprises, for example, an antenna in the cooking chamber 2 and a transmitting-receiving unit-evaluating transceiver. The antenna is capable of enabling broadband transmission or reception of high-frequency radiation in the cooking chamber and, for example, has good transmission and reception properties in the 100 MHz to 5 GHz range. It is preferably designed as a flat structure. The planar structure enables a simple installation. However, it is also possible to use antennae projecting into the cooking chamber 2.

Here the transceiver can transmit, receive, and measure in broadband. Three basic measurement methods are preferred for this purpose: a frequency sweep, a pulse radar, and FMCW (frequency-modulated continuous wave). Characteristic spectra (frequency range) or pulses (time domain) that characterize the cooking chamber interior are preferably generated and detected in all measurements. These spectra are used for computation in a further method. The RF sensor system is thus contactless, broadband, and resilient with respect to contamination. The high-frequency measuring system 3 may also consist of a plurality of transmitters and receivers, similar to an antenna array.

Figure 2:
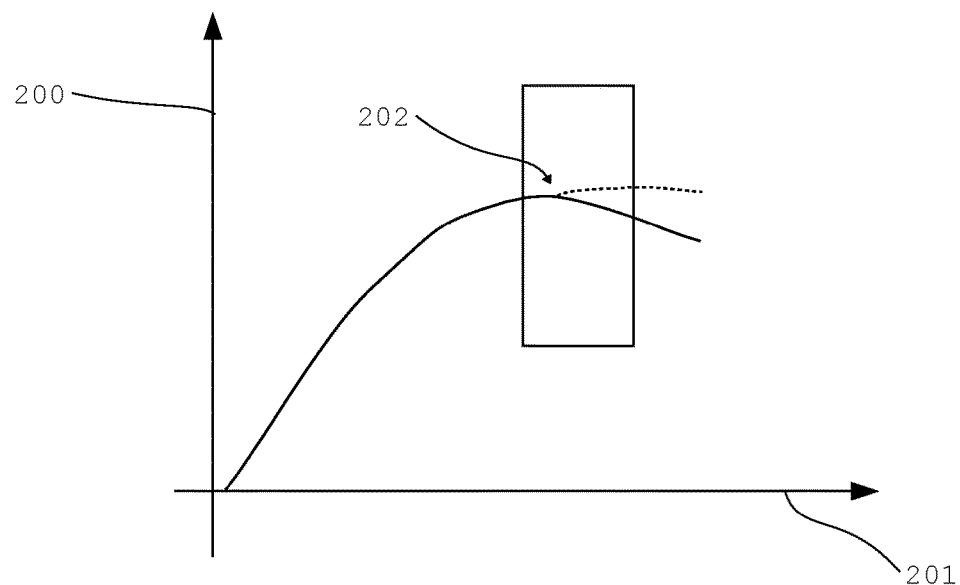
FIG. 2 shows a purely schematic and diagrammatic depiction of a correlation between a variable that is characteristic of the food or cooking state in relation to the cooking duration.

Shown in FIG. 2 is the correlation between a variable 200 that is characteristic of the food or cooking state with respect to the cooking duration 201 and the finished point in time 202 of a foodstuff during preparation in the cooking appliance 1 presented here. The characteristic variables can be the food temperature, food volume, food browning, or their change over time. Additional and derived variables characterizing the cooking state are also conceivable. The rectangularly framed area thereby outlines the time period in which the finished point in time 202 is located and the food has a particularly advantageous degree of cooking or is optimally completely cooked.

With the invention presented here, this time period can be detected particularly reliably and, at the same time, without contact and also resiliently with respect to contamination. By recognizing the finished point in time 202, an optimal adaptation of the treatment program is then possible, such that, for example, the cooking process can be ended at the right time in order to avoid overcooking or drying out.

The greatest challenge in automating cooking processes lies in the variability of foodstuffs and meals. Foodstuffs are very different in terms of their type (meat, vegetables, baked goods), but also in terms of their shape, size, weight, and storage life. In addition, meals are extremely different due to the many different possible combinations. In order to not need to optimize every conceivable recipe and store it in the appliance 1, a self-learning system based on the methods of supervised machine learning is used in the invention described here.

Here, the supervised machine learning is trained with representative data. Classic variables (oven temperature, cooking time, consumed power/energy) are thereby preferably combined with high-frequency data (reflection spectra or S-parameters). Models are thereby created which predict the core temperature of the foodstuff and/or other cooking parameters from the (computed) high-frequency data and further specific appliance data. To form the models, the data set from a representative set of cooking processes is required as a reference. An association of data with the target variable (what is known as the label) for learning is initially contained in these data. Relationships (correlation) between the data and the target variable are now learned. The model is then able to independently infer the target variable from the data.

The model can thereby be selected differently depending on the type of label. For example, analytical models (equations), statistical models such as diverse regressors, up to neuronal networks, convolutional neural networks, and other artificial learning methods are available for selection. Different models are formed and used for different queries.

A label may, for example, be: thawed vs. frozen or core temperature in ° C., or cooked vs. not cooked, or foodstuff type, and many others. The data from the oven or the appliance data describe the thermal and energetic state of the oven. If possible, therefore, they include the operating mode, the connected loads, the running time of the attempts, and/or other variables.

Here, the high-frequency data are optimally pre-processed, and important features are determined via statistical and/or telecommunication engineering approaches. The load is preferably to be characterized by these features.

One particular value of the invention is the evaluation of variations in the S-parameters. The uncertainties of the stationary absolute measurements, for example due to the use of a metal food carrier, can be computationally eliminated in the subtraction and the evaluation of the variations. The measurable variations in the S-parameters then result due to variations in the foodstuff during the cooking process, e.g., the release of water, rising or shrinking, crust formation, and the like, whereas the cooking chamber and its influence on the S-parameters remain constant over time.

The measurable variations in the foodstuff during the baking or cooking process normally follow a typical curve having a maximum toward the end of the cooking process. Many relevant variables, such as core temperature, change in volume, change in browning, or the like, follow this curve (shown schematically in FIG. 2). This is due to, among other things, the fact that the temperature difference between the foodstuff and the oven becomes ever smaller during the cooking process, and the foodstuff becomes edible when the necessary physical (e.g., rise, evaporation of water) and chemical processes (e.g., browning change $\Delta L$, unfolding of proteins) of the cooking are completed.

A special feature of the invention is also the interaction of the HF data and the appliance data or oven data and/or the load data. For the particularly relevant labels, such as the core temperature, the model requires the state of the oven on the one hand, and a description of the load via a further sensor system on the other hand. Only this combination produces a particularly complete overall picture. Here, this additional sensor system is the high-frequency measurement via which the height, size, volume, type, and container of the load are indirectly described. Alternatively, the sensor system can, for example, also be the sensor device 5 having the camera 15 from whose image data these variables are derived.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Cooking appliance
2 Cooking chamber
3 High-frequency measuring system
4 Processing device
5 Sensor device
6 Treatment device
12 Cooking chamber door
15 Camera device
16 Control device
100 Oven
101 Operating device
102 Display device
200 Core temperature
201 Time
202 Finished point in time

The invention claimed is:

1. A method for operating a cooking appliance having at least one cooking chamber for preparing food, comprising:
   simultaneously transmitting a narrowband high-frequency radiation and a broadband high-frequency radiation into the at least one cooking chamber;
   detecting non-visible high-frequency data during a cooking process using at least one high-frequency measuring system, wherein detecting non-visible high-frequency data comprises the at least one high-frequency measuring system detecting reflection spectra of the broadband high-frequency radiation associated with the at least one cooking chamber and/or of the food, and calculating the non-visible high-frequency data from the reflection spectra; and
   deriving at least one cooking parameter characterizing the food from the non-visible high-frequency data using at least one processing device,
   wherein the non-visible high-frequency data is processed using the at least one processing device, and the at least one processing device independently derives the at least one cooking parameter from the non-visible high-frequency data.

2. The method according to claim 1, wherein the at least one high-frequency measuring system detects reflection spectra of the at least one cooking chamber and/or of the food, and the non-visible high-frequency data is calculated from the reflection spectra, and/or the non-visible high-frequency data is the reflection spectra.

3. The method according to claim 1, wherein the at least one cooking parameter is selected from a group of parameters comprising at least core temperature, browning state, moisture state, freezing state, thawing state, cooking state, degree of cooking completion, shrinkage, rise, release of water, crust formation, or variations of the aforementioned parameters over time.

4. The method according to claim 1, wherein wherein the at least one cooking parameter is independently derived from a combination of the non-visible high-frequency data with at least appliance data.

5. The method according to claim 4, wherein the appliance data is selected from a group of data comprising at least thermal and/or energetic state data of the cooking chamber, operating mode, connected loads, and running time of the cooking process.

6. The method according to claim 1, wherein the at least one cooking parameter is independently derived from a combination of the non-visible high-frequency data with at least load data.

7. The method according to claim 6, wherein the load data is detected by the high-frequency measuring system and/or by at least one sensor device.

8. The method according to claim 7, wherein the at least one sensor device comprises at least one camera device.

9. The method according to claim 6, wherein the load data is selected from a group of data comprising at least geometric properties of the food and/or of a food container, a position of the food and/or of a food container, and a type of the food and/or of a food container.

10. The method according to claim 1, wherein at least one treatment device for preparing food is controlled using at least one control device depending on the at least one cooking parameter, and wherein at least one parameter of at least one treatment program is adapted depending on the at least one cooking parameter.

11. The method according to claim 1, wherein the at least one high-frequency measuring system emits high-frequency measuring radiation into the at least one cooking chamber at a plurality of distinguishable frequencies and/or phases and is received again and evaluated, and wherein a reflection spectra is created using at least one comparison of the received measuring radiation with the emitted measuring radiation in a manner dependent on the plurality of distinguishable frequencies and/or phases.

12. The method according to claim 1, wherein the at least one high-frequency measuring system is configured to operate between a 100 megahertz (MHz) and 5 gigahertz (GHz).

13. The method according to claim 1, wherein the narrowband high-frequency radiation transmitted into the at least one cooking chamber is used for preparing the food.

* * * * *